INVENTOR
Paul Naumann
BY Spencer & Kaye
Attorneys

3,494,272
FOCAL-PLANE SHUTTER
Paul Naumann, Alkmaar, Netherlands, assignor to Ernst Leitz G.m.b.H., Wetzlar, Germany
Filed July 5, 1966, Ser. No. 562,704
Claims priority, application Germany, July 3, 1965, L 51,038
Int. Cl. G03b 9/36
U.S. Cl. 95—55     10 Claims

ABSTRACT OF THE DISCLOSURE

A focal-plane shutter in which two rigid blades are used to form a slit having a rectilinear movement parallel to the plane of the film. The slit forming edges of the blades have a rectangular movement parallel to the plane of the film whereas the other edges of the blades move through a curved path. The mechanism for so moving the rigid blades is a four-bar linkage having swivel joints so as to provide very little friction.

---

The present invention relates generally to the photographic art, and, more particularly, to a focal-plane shutter for cameras which are provided with separately operating shutter blades.

Focal-plane shutters having rigid individual blades are already known. This includes those in which the blades extend parallel to the image plane as well as those in which, during operation of the shutter, only the slit forming edges of the blades execute a rectilinear movement parallel to the image aperture whereas the edges of each blade which is parallel to the slit forming edges are guided in the direction of the objective or lens along a curved path. It has also been proposed that only one blade be moved in this manner, i.e., that the first one be moved in this way, and that the second one move along a conventional straight path.

Although the guidance of the blades in the forward direction saves space laterally and provides the possibility for a more compact construction of the camera, no camera is actually known in which this type of blade movement has been carried out in actual practice.

This is due to the fact that the guiding in pairs of the blade edges in a direction at right angles to the direction of movement on guides having different directions has not previously been satisfactorily solved. For example, if the first blade with the forward non-slit forming edge was guided in the direction of the lens approximately on a circular arc, this movement was possibly brought about by using external guide means, for example, by means of pin slot guides. However, this type of guide arrangement for the blades is subject to so much friction that such a shutter can not be used, particularly in higher quality cameras. It is not possible to attain with this arrangement short, or in particular extremely short shutter speeds, of, for example, 1/100 second. The term "forward blade edge" is intended to designate here and in the following discussion that edge which leads during operation of the shutter.

With this in mind it is a main object of the present invention to eliminate the disadvantages of the prior art.

Another object of the present invention is to provide an arrangement for guiding shutter blades for a camera in which all external guide means are eliminated.

Still another object of the invention is to provide a shutter arrangement which provides little friction and which may be constructed in an easy and accurate manner.

These objects and others ancillary thereto are accomplished in accordance with preferred embodiments of the invention wherein each blade is guided by means of a linkage system containing only swivelled joints. Each blade is moved by means of a four-bar linkage which is positioned approximately at a right angle to the plane of the blade, and each blade is non-yieldingly connected with the connecting rod of its four-bar linkage. When connecting the blade with its respective coupling rod of the respective four-bar linkage all external rectilinear guide means are unnecessary. Instead only swivelled joints having very liitle friction are provided, and these may be constructed in an easy and accurate manner. The four-bar linkages for the blades are so positioned in their two operative or end positions that they coincide with each other.

The first blade is non-yieldably connected with the connecting rod of its four-bar linkage in such manner that the forward edge of the blade represents a coupling point which, during movement, describes an arc in the direction of the lens. On the other hand the rearward edge of the blade represents a coupling point which, during movement of the linkage, moves at least approximately on a straight line which is parallel to the plane of the film.

The second blade is non-yieldably connected with the connecting rod of its four-bar linkage in such manner that the forward edge of the blade represents a coupling point which, during movement of the linkage, moves at least approximately on a straight line parallel to the plane of the film. On the other hand its rearward edge represents a coupling point, which during movement of the four-bar linkage, described an arc in the direction away from the lens.

The four-bar linkages act as double cranks and the two centers of rotation of the rotating shafts which are fixed to the housing may be disposed symmetrically to the optical axis of the lens. The rotating cranks may cross each other in any position within the angle of rotation which is assigned to them. However, there are other arrangements possible in which the rotating cranks will not cross each other.

It is particularly advantageous for the mechanical stability of the linkage and for a fault-free operation thereof, that two four-bar linkages be provided for each blade and arranged symmetrically above and below the image aperture edges extending in the direction of movement of the blades.

As a further feature of the invention, springs are provided which act upon the blades. Each is connected at one respective end with the four-bar linkage of the blade which moves the blade through its operative position. It is advantageous if the other respective ends of these springs are hingedly connected to a structural element which is also disposed in the shutter housing and which itself is movable between two positions and is also subjected to the force of a spring.

As another feature of the invention, a releasable click-stop device is provided for this structural element which is connected to the respective ends of the blade springs and the click-stop device maintains the structural element in one of its end positions. The structural element is brought into this specific end position and locked in this position while both the blade operating springs and also the spring of the structural element are being tensioned. This structural element includes an abutment for the first and, if desired, also for the second blade and for the four-bar linkages thereof. Its catch may be released by means of a link which is actuated by the second blade.

As a result of this arrangement, after the second blade has operated the catch of the above-mentioned structural element is released and this structural element is returned to its starting position. At this time by means of its abutment it carries along the first blade and also the second blade. The second blade will be carried along if, after operation, the second blade also comes to rest against this abutment either by itself or with one of the linkage members. It is also possible to provide for the second blade to come to rest against the first blade in a suitable manner so that the first blade during the return movement will push the second blade before it.

Since the catch of the structural element is released by the second blade immediately at the end of the operative movement thereof, and since the return movement of both blades commences immediately thereafter, there is no retention of the blades in the operated position. Therefore, both blades will always be positioned at their starting positions unless they happen to be moving at a particular time. The velocity of the return movement is dependent only upon the force of the spring acting on the structural element and may be extremely short when there is a great spring force, and may amount, for example, to $\frac{1}{200}$ second. The result is the advantage that a labyrinth on the slit forming blade edges for preventing a light leak may be omitted. A simple narrow covering for the blades is fully sufficient at this speed in order to prevent any appreciable amount of light from reaching the film.

The structural element is additionally disposed on the shutter housing and is in operative engagement with the lever of the camera for cocking the shutter. During this operation, however, only springs are tightened in the shutter according to the present invention and the blades or blinds are not returned to their starting position.

Additional objects and advantages of the present invention will become apparent upon consideration of the following description when taken in conjunction with the accompanying drawings in which.

Figure 1:
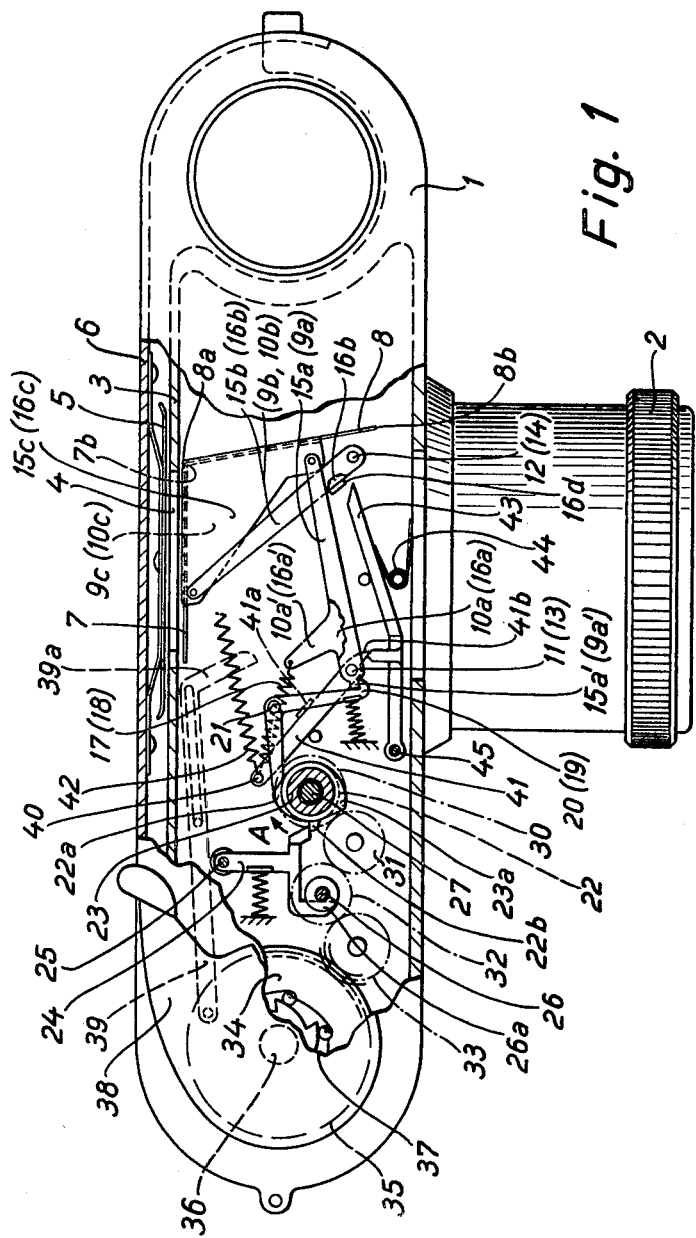
FIGURE 1 is a schematic plan view, with parts being broken away for clarity, of a camera equipped with the shutter of the present invention and which is shown in the cocked condition.

With more particular reference to the drawings, a camera housing 1 is provided with a lens 2 in a known manner and inside the housing includes an image aperture plate 3 having an image aperture 4. A film pressure plate 5 is disposed behind the image aperture plate 3 and is resiliently retained on the housing wall 6.

The focal-plane shutter is arranged in front of the image aperture 4 and includes two rigid individual blades 7 and 8. The first blade is mounted to and moved by two four-bar linkages which are positioned, as viewed in the plan view, in coincidence with each other and symmetrically to the optical axis. The four-bar linkages include the levers 9a, 9b, 10a, and 10b. The leavers 9a and 9b are rotatable about the pins 11 and 12 which are fixedly connected with the housing. The connecting rod member 9c is pivotally connected between the free ends thereof. In the same manner the levers 10a and 10b are rotatable about the pins 13 and 14, respectively, and the connecting rod 10c is hingedly connected between their free ends.

Figure 3:
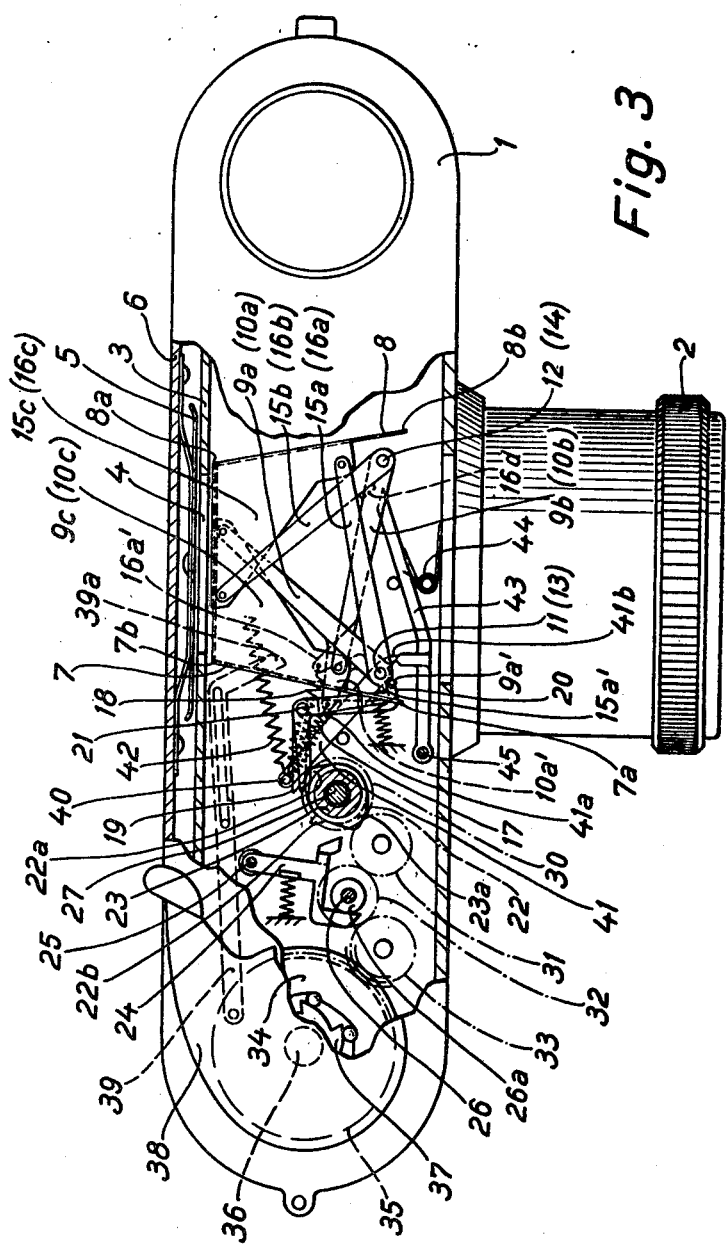
FIGURE 3 is a plan view similar to FIGURE 1, illustrating the shutter in position after the first blade has been operated.

Since, (1) the pins 11 and 13, one one hand, and the pins 12 and 14, on the other hand, have the same geometric axis, (2) these two axes are disposed symmetrically to the optical axis (see FIGURES 1 and 3), and (3) all of the levers are of equal length, the four-bar linkages are thus completely symmetrical and operate between two end positions as double cranks which are also positioned symmetrically with the optical axis (see FIGURE 3).

Figure 4:
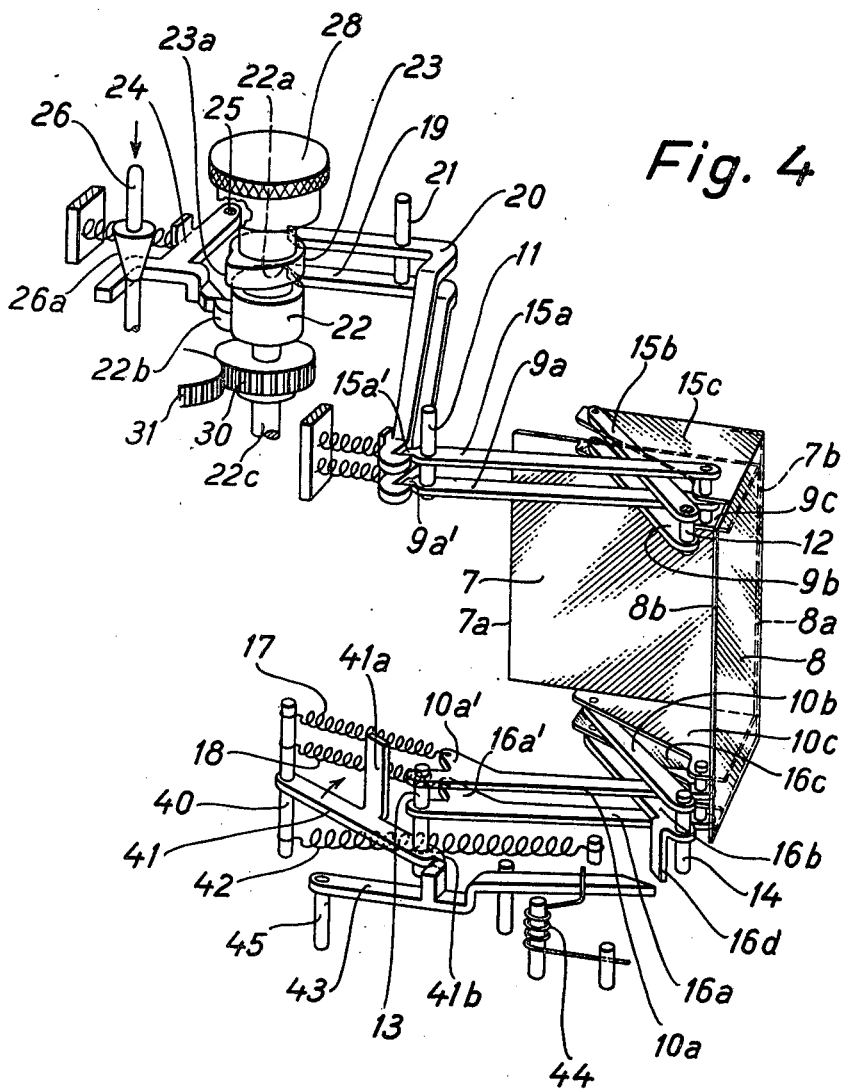
FIGURE 4 is a schematic perspective view of the shutter in the cocked condition.

The connecting rods 9c and 10c are actually the connections between the levers 9a, 9b and 10a, 10b and are widened into flanges between which the first blade 7 is connected as shown in FIGURE 4. The forward edge 7a and the rearward edge 7b of this blade are therefore coupling points of the connecting flanges 9c and 10c, respectively. That is, the forward edge 7a represents a coupling point which, during operating movement of the two four-bar linkages, traverses a curved path which is an arc having a slight curvature in the direction of the lens, whereas the rearward edge 7b moves on a straight line parallel to the image aperture plane and also to the plane of the film.

The second blade 8 is mounted on and moved by two four-bar linkages which include the levers 15a, 15b and 16a, 16b. These levers are coincident with levers 9a, 9b, 10a, and 10b, respectively, in the end position of the linkage. Lever 15a is rotatable about pin 11, lever 15b is rotatable about pin 12, lever 16a is rotatable about pin 13, and lever 16b is rotatable about pin 14. Furthermore these levers are all of the same length and also the same length as levers 9a, 9b, 10a and 10b (see FIGURE 4). The levers 15a and 15b are connected by connecting rod 15c and the levers 16a and 16b are connected by the connecting rod 16c. Both connecting rods are widened into flanges between which the second blade 8 is connected. The forward edge 8a of the blade is thus a coupling point which moves parallel to the plane of the image aperture and the rearward edge 8b traverses a curved path in the direction away from the lens. It can be seen from FIGURES 2 and 4 that levers 15a, 15b, 16a and 16b are positioned outside levers 9a, 9b, 10a and 10b and are coordinated therewith so that the connecting flanges 15c and 16c together with the second blade 8 enclose the first blade 7 with its connecting flanges and levers in such a manner that the two blades with their levers will not disturb each other during operation of the shutter.

The force for providing movement to the blades is supplied by two springs 17 and 18. In the example illustrated the springs are tension springs which act upon levers 10a and 16a respectively. It would be readily possible to provide, instead of the tension springs, helical springs which are rotationally stressed.

In the cocked position of the shutter, the blades are held by means of two releasing levers 19 and 20, and the lever 19 engages behind the locking nose 9a' of the lever 9a to thus hold the first blade 7 (see FIGURE 4). The second blade 8 is arrested by the releasing lever 20 which engages the lever 15a behind the locking nose 15a' thereof. The locking noses 9a' and 15a' during shutter operation rotate with the levers about pin 11.

The releasing levers 19 and 20 are in the form of two-armed levers which are rotatable about common axle 21. At their other respective ends they cooperate with a time control column of known construction. This time control column includes cam plates 22 and 23 which are displaceable with respect to each other. The cam plate 22 together with the surface 22a thereof is designed to actuate the releasing lever 19 for the first blade 7. In the cocked position of the time control column the cam surface 22a is positioned directly at the lever 19 so that at the beginning of rotation of the time control column the first blade 7 is instantly released. In this cocked position the time control column is retained by lever 24 against which a cam 22b rests. This cam 22b is made integral with and rigidly connected to the cam plate 22. Lever 24 is rotatable about the axle 25 and is subjected to the action of the release rod 26. This release rod 26 has a conical portion 26a, which, in its depressed condition, pivots lever 24 in such a manner that the time control column is released for operation.

Figure 2:
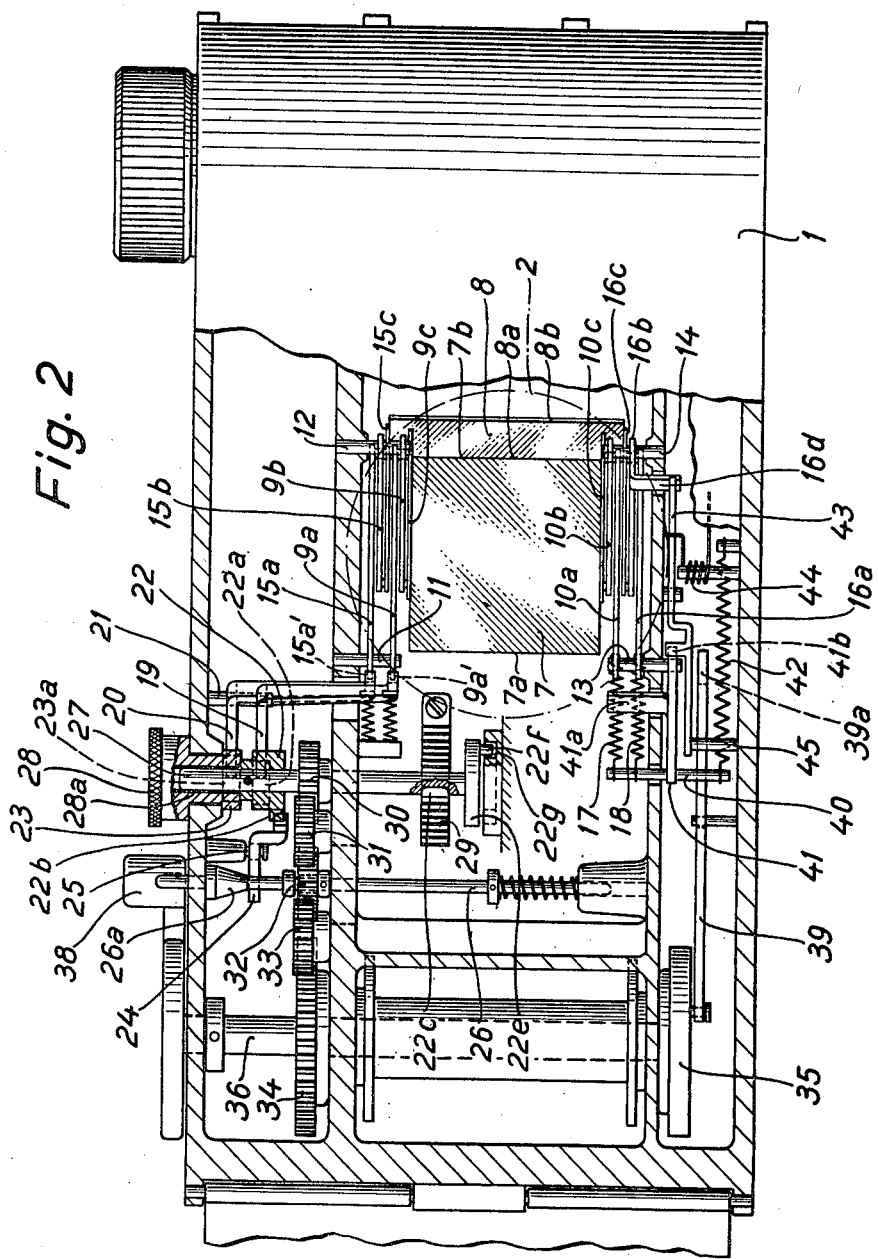
FIGURE 2 is a front view of the camera of FIGURE 1, partially in section.

Cam plate 23 together with its cam surface 23a is designed for releasing the second blade 8, and this cam is connected coaxially with cam 22 and is arranged to rotate therewith by means of friction clutch 28a (see FIGURE 2). The axle of cam plate 23 extends through the upper housing wall and is rigidly connected with the shutter or time setting device 28 which is accessible from outside of the housing. The time difference between operation of the first blade and of the second blade may thus be regulated in a manner which is known per se by a relative displacement of cam surface 23a with respect to cam surface 22a.

A helical spring 29 (see FIGURE 2) is provided for driving the time control column and is secured on one end to the axle 22c and at its other end to the camera housing. A gear 30 is fixedly mounted on axle 22c and, via idler gear 31, meshes with gear 32 which is rotatably mounted on releasing axle 26. Gear 32 is in operative engagement with large gear 34 via idler gear 33. A one-way clutch 37 is provided in the large gear 34 between axle 36 and the toothed rim of the gear. This provides that this gear 34 only executes the cocking movement of axle 36 and not the return movement.

The lower end of axle 22c has a plate 22e and a pin 22f mounted thereon. This pin rotates in a groove 22g which is formed in an element which is fixed to the housing and this movement occurs during operation of the time control column. This groove is in the form of a circular arc to thereby define an oblong slot. The pin 22f strikes against the ends of this oblong slot and in this manner limits the rotary movement of axle 22C to not quite one full revolution.

The gear 34 is connected to the cocking lever 38 of the camera and follows the known to and fro movement of this cocking lever. The stops or abutments which limit this movement, as well as the return springs, have not been illustrated in the drawings for the sake of clarity. Axle 36 extends into the lower portion of the camera housing and interiorly of the film winding spool, and below the spool is connected with a plate 35 to which a tensioning lever 39 is eccentrically and rotatably secured. The function of this tensioning lever will be described below.

The previously-mentioned springs 17 and 18 which supply the force for movement of the blades 7 and 8 are pivotally connected at their one respective ends to the levers 10a and 16a and are connected at the other respective ends to pin 40 of lever 41 (see FIGURE 4). Lever 41 as the levers 10a and 16a is rotatable about axle 13, and is subjected to the force of a spring 42 which is connected to act on this lever. It may be brought into two end positions, one of which is the released position and the other is the tensioned position of spring 42. In the tensioned position the lever 41 is held by locking lever 43 which engages lever 41 behind locking cam 41b, and this locking lever 43 is maintained in its position by a helical spring 44. The locking lever 43 is a one-armed lever and is rotatable about axle 45 and has its forward end projecting into the pivoting range of the lug 16d which is bent at an angle with respect to the lever 16b on which it is mounted. As described above the lever 16b is part of the four-bar linkage which supports and moves the second blade 8. At the end of shutter operation the lug portion 16d abuts against locking lever 43 and pivots this lever to such an extent that the stop of lever 41 is removed and the spring 42 may therefore become untensioned at the end of shutter operation.

The tensioning lever 39, (see FIGURES 1 and 2), provides for the retensioning of springs 17, 18 and 42. This lever is eccentrically secured to plate 35 near the bottom of the camera housing and during actuation of the cocking lever 38, follows the to and fro motion thereof in a manner analogous to that of a crank. In the rest position it is disposed as shown in FIGURE 1 in which the hook 39a extends in a slightly inclined direction with respect to the optical axis. The lower part of pin 40 abuts against this hook 39a if spring 42 is slackened which has the effect of pulling the lever 41 into its slackened or released end position. During the subsequent actuation of the cocking lever 38 this hook moves approximately parallel to the plane of the image aperture and in doing so pivots the lever 41 back into its tensioned position.

The operation of the shutter according to the present invention which was described above is initiated by depressing the shutter release bar 26. At this time gear 32 will not be engaged with gears 31 and 33 and the conical portion 26a will strike lever 24 and pivot it to a sufficient extent that the cam portion 22b of the time control column will glide off the forward end of the lever. Also the time control column is free for rotating in the direction or arrow A as shown in FIGURE 1. Immediately in the first phase of this rotation cam portion 22a pivots the releasing lever 19 clockwise so that the locking nose 9a' at the lever 9a and also the two four-bar linkages which move the first blade are freed for movement. Under the tension of the springs 17 the levers 9a, 9b, 10a and 10b pivot counterclockwise as seen in FIGURES 1 and 4 about the stationary pins 11, 12, 13 and 14 into the other end position thereof. This end position is defined by abutment of the lug portion 10a' against the lug portion 41a which is bent at an angle with respect to lever 41. This end position is illustrated in FIGURE 3. During movement in this direction the forward edge 7a of blade 7 has traversed a slightly curved path in the direction of the lens whereas the rearward edge 7b has moved along a straight line parallel to the plane of the image aperture.

After a predetermined temporary displacement which depends upon the relative position of the cams 22a and 23a with respect to each other and which relative positioning was accomplished by rotating the time setting device 28 prior to the taking of the picture, the cam 23a also will now strike its releasing lever 20 during further operation of the time control column. This cam also is pivoted clockwise and frees the locking nose 15a' of lever 15a and at the same time permits the second blade 8 to operate. This operation takes place under the force of spring 18 which is slackened until the lug portion 16a'—as the lug portion 10a'—rests against the lug portion 41a. The forward edge 8a of blade 8 at that time follows the rearward edge 7b along the straight path parallel to the plane of the image aperture and the rearward edge 8b travels on a slightly curved path away from the lens in the direction of the plane of the image aperture. After operation of the shutter the second blade 8 will therefore be positioned parallel to the plane of the image aperture and in front of the image aperture 4.

The dimensions of the levers and the abutments are so arranged that upon a temporary coincidence or abutting of the lug portion 16a' with lug portion 41a, the lug portion 16b will also strike against the locking lever 43 and pivot it clockwise. The locking lever 43 is moved out of engagement behind locking cam 41b of lever 41 and the catch is thus released. As a result lever 41 pivots under the force of spring 42 in a clockwise direction until the pin 40, which is rigidly connected with the lever, strikes against hook 39a of tensioning lever 39.

During this pivoting or rotational movement the lug 41a pushes the lug portions 10a' and 16a' before it and thus all four four-bar linkages and the two blades 7 and 8 are returned into their starting position without any change in the relative positions of the blades 7 and 8 with respect to each other. Depending upon the force of spring 42 this return movement may take place relatively rapidly, for example at such a speed that no true labyrinth is needed at the slit forming edges of the blades 7 and 8 for preventing a light leak. Instead a simple covering of the blade edges is sufficient, and for the sake of simplicity in the drawings this has not been shown.

Both in the tensioned and the operated condition of the shutter the blades and all of the four-bar linkages are in the same relative position to each other. In this position the springs 17, 18 and 42 must now again be retensioned. This tensioning is accomplished by actuating the cocking lever 38 in a manner which is known per se. In addition to the film being transported by one image length in a known manner, this cocking movement is transmitted to the plate 35 via the axle 36, and plate 35 thus has the same rotary movement as the cocking lever 38. At that time tensioning lever 39 has a to and fro motion along the first part of which it carries along the pin 40 and the lever 41 and pivots it counterclockwise. At the end of this pivoting, the locking lever 43 falls into place behind the locking cam 41b and lever 41 will now remain in this position and spring 42 remains tensioned. The springs 17 and 18 during this movement are equally tensioned since during the return movement of the four-bar linkages the releasing levers 19 and 20 have snapped into place behind the locking noses 9a' and 15a' and retain the four-bar linkages in their respective starting positions.

Simultaneously with the return pivoting movement of lever 41 and the tensioning of springs 17, 18 and 42, the helical spring 29 of the time control column is tensioned during actuation of cocking lever 38. The rotational movement of gear 34 which is connected to cocking lever 38 by means of one-way clutch 37 is transmitted to gear 30 via gears 33, 32, and 31. Thus the entire time control column is turned back into its starting position and spring 29 is tensioned. In the starting position the lever 24 again falls into place behind the cam 22b and retains the time control column against operation until the next releasing movement of the shutter.

The cocking lever 38 automatically returns into its rest position after it has been actuated in a manner which is known per se and under the action of a spring which is not shown. It then pushes the tensioning lever 39 into the position illustrated in FIGURE 1. As to the gear train 30 to 34, the return into the rest position is possible because gear 34 is connected to axle 36 by means of the one-way clutch 37 which allows for a return movement of the axle 36 without transmitting this movement to gear 34. After the return of the cocking lever 38 into its rest position the camera is ready for taking another picture and the shutter operation is as described above.

Figure 5:
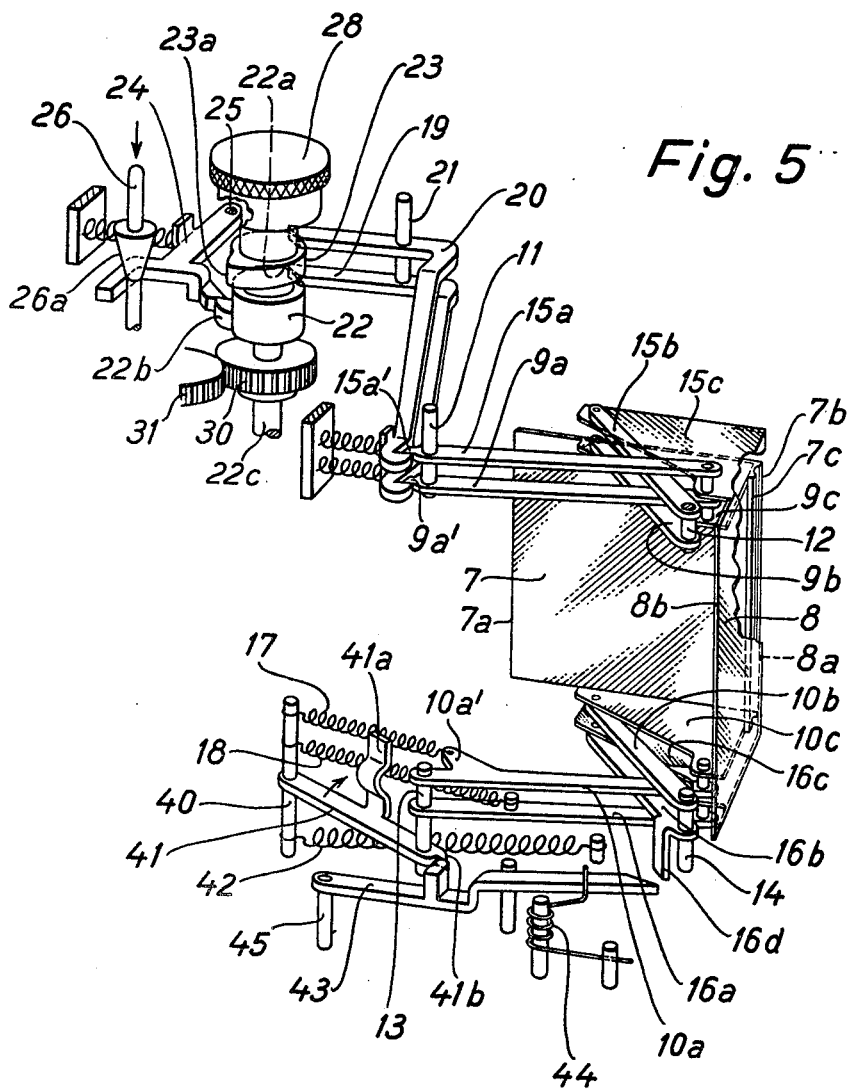
FIGURE 5 is a view similar to FIGURE 4 with the leading shutter blade being provided with an abutment for the lagging shutter blade to rest against.

Instead of the second shutter blade 8 being pushed back by lug 41a to its starting position, this may also be accomplished by the first shutter blade 7 itself. Structure which enables the shutter blade 7 to perform this function is depicted in FIGURE 5. Here shutter blade 7 is provided at its edge 7b with a bar 7c which serves as an abutment for the forward edge 8a of lagging shutter blade 8.

Lever 16a therefore does not carry lug position 16a' which in the embodiment according to FIGURE 4 comes to rest against lug 41a at the end of the movement of blade 8. The forward edge 8a rather abuts against bar 7c at the end of this movement, which end is timed to coincide with the striking of lug portion 16d against the locking lever 43.

The return movement of the shutter blades is initiated by the release of lever 41, which under the stress of spring 42 is pivoted in a clockwise direction. Lug portion 41a thus pushes lug portion 10a' of lever 10a before it which in turn swings shutter blade 7 back to its starting position. The latter by means of bar 7c is in contact with shutter blade 8 and in turn pushes blade 8 to its starting position in which locking nose 15a' snaps behind releasing lever 20 at the same moment at which locking nose 9a' of lever 9a snaps behind releasing lever 19. Both shutter blades are thus held in their starting position during the following period of tensioning springs 17, 18 and 42.

It will be understood that the above description of the present invention is susceptible to various modifications, changes, and adaptations, and the same are intended to be comprehended within the meaning and range of equivalents of the appended claims.

What is claimed is:

1. A focal-plane shutter comprising, in combination: two separately operating individual rigid blades each having a slit forming edge; and
means for moving said blades for imparting to the slit forming edges a rectilinear movement parallel to the plane of the film and for imparting to the edges of the blades positioned opposite the slit forming edges a movement through a curved path extending toward the camera lens, said means including a linkage having swivel joints, said means including for each blade at least one four-bar linkage for moving said blade, and each blade being rigidly connected with the connecting rod of the four-bar linkage thereof.

2. An arrangement as defined in claim 1 wherein said four-bar linkage for each said blade is positioned substantially at a right angle to the plane of its associated blade and is arranged for movement in a plane substantially perpendicular to the plane of its associated blade.

3. A focal-plane shutter as defined in claim 1 wherein there is a housing in which the shutter and a lens having an optical axis are disposed, the first blade is rigidly connected with the connecting rod of its four-bar linkage so that the forward edge of the blade represents a coupling point which during movement of the linkage describes an arc in the direction of the lens and the rearward edge of the blade represents a coupling point which during movement moves at least approximately on a straight line parallel to the plane of the film, said second blade being rigidly connected to the connecting rod of its four-bar linkage so that the forward edge of the blade represents a coupling point which during movement moves at least approximately along a straight line parallel to the plane of the film and the rearward edge of the blade represents a coupling point which during movement describes an arc in the direction of the lens, the two centers of rotation of the linkages being fixedly connected with the housing and disposed symmetrically with respect to the optical axis, and arranged so that within the angle of rotation which is permitted the levers of the linkages cross each other in each end position thereof.

4. A shutter as defined in claim 3 wherein the four-bar linkages are arranged to act as double cranks.

5. A shutter as defined in claim 4 wherein said housing includes an image aperture plate having an image aperture and there are two four-bar linkages for each blade and these are arranged symmetrically above and below the image aperture edges extending in the direction of movement of the blades.

6. A shutter as defined in claim 5 wherein said means mount said blades for movement between a cocked position and an operated position, and blade spring means being provided for each blade for biassing from its cocked position into its operated position.

7. A shutter as defined in claim 6 comprising an element mounted on the housing and movable between two positions and having an abutment disposed, in one position of said element, for engaging one link of the four-bar linkage of the first blade when the first blade moves into its operated position; element spring means for biassing said element from said one position into its other position when said blade spring means are biassing their respective blades toward their operated positions; each blade spring means being connected between a respective lever on said respective one link and said element; and cooperable and releasable catch means which includes a portion of said element for maintaining said element in its one position against the biassing of said element spring means and positioned to be released by the four-bar linkage of the second blade as it moves into its operated position.

8. A shutter as defined in claim 6 comprising a spring-loaded releasing lever for each blade, one four-bar linkage for each blade having a locking nose which cooperates with a respective releasing lever to retain the associated blade in its cocked position against the biassing of said blade spring means; and separately operating time control means for controlling the releasing of said levers, one link of the four-bar linkage of the second blade engaging said abutment of said element when the second blade moves into its operated position so that after release of said catch means said element moves both blades, via said abutment, back into their cocked position by the force of said element spring means and the releasing levers again engage behind the locking noses of said four-bar linkages.

9. A shutter as defined in claim 8 wherein said first blade or its four-bar linkage includes an abutment, said second blade being arranged to rest against said abutment in the operated position of said second blade, and said first blade being arranged to push the second blade before it during the return movement thereof to the cocked position.

10. A shutter as defined in claim 9 comprising cocking lever means for cocking the shutter and operatively engaging said element.

References Cited
UNITED STATES PATENTS

| | | | |
|---|---|---|---|
| 2,186,610 | 1/1940 | Leavitt | 95—36 |
| 2,377,341 | 6/1945 | Hannum | 95—31 |
| 2,921,510 | 1/1960 | Meixner | 95—55 |
| 3,078,776 | 2/1963 | Okabe | 95—55 |

JOHN M. HORAN, Primary Examiner

LEO H. McCORMACK, Jr., Assistant Examiner